United States Patent [19]

Greco et al.

[11] Patent Number: 4,996,283

[45] Date of Patent: Feb. 26, 1991

[54] REACTIVE HOT MELT COMPOSITION

[75] Inventors: Alberto Greco, Dresano; Sergio Giordano, Peschiera Borromeo; Enrico Pozzi, Milan; Patrizia Blasioli, Biassono, all of Italy

[73] Assignees: Enichem Synthesis S.p.A., Palermo; Boston S.p.A., Milan, both of Italy

[21] Appl. No.: 431,911

[22] Filed: Nov. 6, 1989

[30] Foreign Application Priority Data

Nov. 18, 1988 [IT] Italy ................................ 22653 A/88

[51] Int. Cl.$^5$ ............................................ C08G 18/44
[52] U.S. Cl. ...................................... 528/80; 528/83; 528/85
[58] Field of Search .............................. 528/80, 83, 85

[56] References Cited

U.S. PATENT DOCUMENTS 4,891,421  1/1990  Nishimura et al. ................ 528/85

Primary Examiner—Maurice J. Welsh
Attorney, Agent, or Firm—Hedman, Gibson, Costigan & Hoare

[57] ABSTRACT

A reactive hot melt composition comprises the products of the reaction between (A) an aliphatic or aromatic diisocyanate and (B) a mixture containing: (1) a crystalline polycarbonate diol, (2) an elastomeric polycarbonate diol or an elastomeric polycarbonate copolyester diol, and possibly (3) a vitreous polycarbonate diol or a vitreous polycarbonate copolyester diol. The process for preparing the reactive hot melt composition is also described.

14 Claims, No Drawings

REACTIVE HOT MELT COMPOSITION

This invention relates to a reactive hot melt composition and its preparation process.

Reactive hot melts are known products of the art and are used mainly in the vehicle industry, in bookbinding, in the textile industry, in the wood industry and in cellular manufacture.

One known class of reactive hot melts is that based on prepolymers carrying free NCO groups at their chain ends, and is prepared by reacting a diisocyanate with a polyester, especially an aliphatic polyadipate diol, having hydroxyl termination. For this known method, reference should be made to H. F. Huber and H. Muller, Adhesive Age, Nov. 1987, page 19. It is also known in the art to use mixtures of hydroxy-terminating polyesters having different characteristics, so as to exercise control over certain hot melt properties such as adhesion to the substrate and hardening time, as described for example in European patent applications, publication Nos. 96,249 and 202,491. The main drawback in the use of polyesters is their hydrolytic instability, with the result that crosslinked hot melts suffer in the medium or long term from mechanical weakening and loss of adhesion.

The object of the present invention is to overcome this drawback of the state of the art by new polycarbonate-based hot melt compositions possessing good general characteristics and having high resistance to degradation.

This is attained according to the present invention by a holt melt composition cross-linkable by the action of environmental humidity or heat to form cross-linked products having high degradation resistance, comprising the product of the reaction between:

(A) an aliphatic or aromatic diisocyanate, and
(B) a mixture of the following diols:
  (1) a crystalline polycarbonate diol having a number-average molecular weight (Mn) of between 1,000 and 10,000, a glass transition temperature (Tg) of less than $-50°$ C., and a $\Delta H$ of crystallization equal to or greater than 80 J/g, prepared by a transesterification reaction between an organic carbonate and one or more HO—$(CH_2)_x$—OH aliphatic diols, where x is a whole number equal to or greater than 8,
  (2) an elastomeric polycarbonate diol or an elastimeric polycarbonate copolyester diol, having a number-average molecular weight (Mn) of between 1,500 and 6,000 and a glass transition temperature (Tg) of between $-35$ and $-60°$ C., said elastomeric polycarbonate diol being prepared by a transesterification reaction between an organic carbonate and one or more HO—$(CH_2)_y$—OH aliphatic diols, where y is a whole number less than 8, or said elastomeric polycarbonate copolyester diol being prepared by a transesterification reaction between an organic carbonate, one or more HO—$(CH_2)_y$—OH aliphatic diols, where y has the aforesaid meaning, and a lactone or an aliphatic polyester diol oligomer, and
  (3) a vitreous polycarbonate diol or a vitreous polycarbonate copolyester diol having a number-average molecular weight (Mn) of between 600 and 6,000 and a glass transition temperature (Tg) of between $-10$ and $50°$ C., said vitreous polycarbonate diol being prepared by a transesterification reaction between an organic carbonate and a cycloaliphatic diol or mixture of cycloaliphatic and aliphatic diols, said vitreous polycarbonate copolyester diol being prepared by reaction between an organic carbonate, a cycloaliphatic diol or mixture of cycloaliphatic and aliphatic diols, and an aromatic polyester diol oligomer, wherein for each 100 parts by weight of the sum of (1), (2) and (3), component (1) is present in a quantity of between 30 and 70 parts by weight, component (2) is present in a quantity of at least 20 parts by weight, and component (3) is present in a quantity of between 0 and 50 parts by weight, and the ratio of NCO groups of component (A) to OH groups of component (B) exceeds 1.

Preferably, the diol mixture (B) contains between 30 and 50 parts by weight of component (1), between 30 and 70 parts by weight of component (2) and between 0 and 40 parts by weight of component (3) per 100 parts by weight of the sum of (1), (2) and (3), and the ratio of NCO groups of component (A) to OH groups of component (B) is between 1.5 and 2.2.

The aliphatic and aromatic diisocyanates (A) usable for the purpose of the invention can be chosen from diphenylmethane diisocyanate, hydrogenated diphenylmethane diisocyanate, isophorone diisocyanate, hexamethylene diisocyanate, tetramethyl xylylene diisocyanate, phenylene diisocyanate and tolylene diisocyanate. Either pure diisocyanates can be used or technical diisocyanates containing a fraction of polyisocyanates.

The crystalline polycarbonate diol (B1) is a solid product with a melting point normally in the range of $50°–70°$ C., a high crystallization rate, a $\Delta H$ of fusion normally in the range of 80–115 J/g and a hydroxyl functionality equal to or greater than 95% of theoretical. Its number-average molecular weight (Mn) is preferably between 2,000 and 4,000. This crystalline polycarbonate diol is prepared from an organic carbonate and an HO—$(CH_2)_x$—OH aliphatic diol, where x is a whole number equal to or greater than 8. The organic carbonate can be a dialkyl carbonate, a dialkylene carbonate, a cycloalkylene carbonate or a diaryl carbonate. Diallyl carbonate is preferably used. The aliphatic diol is preferably chosen from 1,10-decanediol and 1,12-dodecanediol. The transesterification is normally conducted with a diol/organic carbonate ratio of between 1.03 and 1.3 at a temperature of between about 80 and about 200° C. for a time of between about 4 and about 10 hours, the alcohol, glycol and phenol which form as by-products being removed. To facilitate this removal it is convenient to operate at reduced pressure, for example 50–200 torr, at least during the final part of the reaction. When the organic carbonate is a dialkyl carbonate or a dialkylene carbonate, it is necessary to use a transesterification catalyst, preferably of alkaline type, for example an alkaline alcoholate such as sodium methylate.

The elastomeric polycarbonate diol or elastomeric polycarbonate copolyester diol (B2) is either a liquid at ambient temperature or a low-melting solid (melting point up to about 50° C.), with hydroxyl functionality equal to or greater than 95% of theoretical. Its number-average molecular weight (Mn) varies preferably from 2,000 to 4,000 and its glass transition temperature (Tg) varies preferably from $-50°$ to $-60°$ C. The elastomeric polycarbonate diol is prepared from an organic carbonate, preferably diallyl carbonate, and an HO—$(CH_2)_y$—OH aliphatic diol, where y is a whole number less than 8, operating under the aforedescribed transesterification conditions. The aliphatic diol is preferably 1,5-pentanediol or 1,6 hexanediol or mixtures of the two.

The elastomeric polycarbonate copolyester diol (B2) can be prepared from an organic carbonate, an $HO-(CH_2)_y-OH$ aliphatic diol, where y has the aforesaid meaning (and preferably 1,5-pentanediol, 1,6-hexanediol or mixtures of the two), and a lactone, preferably caprolactone, operating under the aforedescribed transesterification conditions. In this case it is convenient to use a caprolactone quantity of between 15 and 30% w/w of the sum of the moles of diol and caprolactone.

The elastomeric polycarbonate copolyester diol can also be prepared under the aforedescribed transesterification conditions, from the organic carbonate, the $HO-(CH_2)_y-OH$ diol, where y has the aforesaid meaning (and preferably 1,5-pentanediol, 1,6-hexanediol or mixtures of the two), and an aliphatic polyester diol oligomer. In particular, said oligomer can be prepared by condensing an aliphatic dicarboxylic acid, normally chosen from succinic, adipic, sebacic and dodecanoic acids, an $HO-(CH_2)_y-OH$ aliphatic diol, where y has the aforesaid meaning (and preferably 1,5-pentanediol, 1,6-hexanediol or mixtures of the two), and neopentyl glycol, in a molar ratio of between 4/1 and 1/1, operating at a temperature of between 100° and 250° C., with continual removal of the water which is evolved as reaction by-product. The reaction is continued until an oligomer is obtained having a number-average molecular weight (Mn) from about 350 to about 750.

The vitreous polycarbonate diol or vitreous polycarbonate copolyester diol (B3) is a normally solid product, with a number-average molecular weight (Mn) preferably in the range of 700 to 3,000. The vitreous polycarbonate diol is prepared under the aforedescribed transesterification conditions from an organic carbonate and a cycloaliphatic diol preferably chosen from cyclohexanedimethanol and tricyclohexanedimethanol. A mixture of cycloaliphatic and aliphatic diols can also be used.

The vitreous polycarbonate copolyester diol (B3) is prepared under the aforedescribed transesterification conditions from an organic carbonate, a cycloaliphatic diol (preferably cyclohexanedimethanol or tricyclodecanedimethanol) or a mixture of cycloaliphatic and aliphatic diols, and an aromatic polyester diol oligomer. This latter is produced by condensing an aromatic acid, such as phthalic, isophthalic or terephthalic acid and a cycloaliphatic diol (preferably cyclohexanedimethanol or tricyclodecane dimethanol), in a molar ratio of between 2/1 and 4/3, operating under the aforedescribed conditions, until an oligomer is obtained having a number-average molecular weight (Mn) from about 500 to about 1000.

The reactive hot melt composition according to the present invention is prepared by reacting the diisocyanate (A) with the diol mixture (B) within the aforedefined ratio range. The reaction is conducted in bulk or with the possible addition of a small quantity of diluent to reduce the viscosity of the reaction mixture, operating at a temperature below 110° C., and preferably within the range of 60°-100° C., for a time generally between 0.5 and 6 hours. Small quantities of an organometallic tin, lead, mercury or titanium catalyst can be present. If used, the catalyst is present in a quantity of less than 0.2% by weight and generally between 0.05 and 0.1% by weight with respect to component (B). However, in the preferred embodiment, the process is carried out without catalyst.

Under the aforedescribed conditions, the reactive hot melt compositions according to the present invention are obtained in the form of a low-melting solid (melting point between about 30° and about 70° C.), having a viscosity of between about 10 and about 50 Pa.s measured at 105° C. and a glass transition temperature (Tg) of between about $-60°$ and about 50° C. These compositions possess excellent rheological characteristics, can be stored for at least 6 months at ambient temperature and are able to cross-link, at an appreciable rate, by the effect of environmental moisture or heat, to give cross-linked products possessing excellent general characteristics, in particular resistance to degradation, and especially hydrolytic degradation, which are much better than those of conventional hot melts based on polyesters.

The reactive hot melt compositions according to the present invention can also contain cross-linking catalysts (such as tertiary amines and organometallic tin compounds), adhesion promoters (such as functionalized trialkoxysilanes), inorganic fillers (such as carbon, calcium carbonate and talc), antioxidants and stabilizers (such as sterically hindered amines, sterically hindered phenols, hydroxybenzotriazoles and hydroxybenzophenones), flame retardants and resinous tackiness agents (such as butadiene acrylonitrile resins).

The invention is further illustrated by the following experimental examples.

EXAMPLES 1-4

Transesterification of diallyl carbonate with 1,10-decanediol is conducted under the conditions reported in the description using a molar 1,10-decanediol/diallyl carbonate ratio of 1.1 and 1.09 to prepare the crystalline polycarbonate diols of Examples 1 and 2 respectively. The crystalline polycarbonate diols of Examples 3 and 4 are likewise prepared using 1,12-dodecanediol, with a molar 1,12-dodecanediol/diallyl carbonate ratio of 1.11 and 1.05 respectively.

The characteristics of these crystalline polycarbonate diols are shown in Table 1. The unsaturations of allyl type present in these products were in all cases less than 0.015 meq/g.

TABLE 1

| Ex. No. | 1 | 2 | 3 | 4 |
|---|---|---|---|---|
| OH No. (mg KOH/g) | 42 | 32 | 54 | 34.9 |
| Melting point (°C.) | 51.5 | 58.1 | 59 | 66.9 |
| Tg (°C.) | −60 | −60 | −60 | −60 |
| Viscosity (Pa.s; 75° C.) | 2.1 | 9.4 | — | 2.6 |
| ΔH crystallization (J/g) | 95 | 105 | 113 | 115 |
| Mn | 2076 | 3500 | 2070 | 3100 |

EXAMPLES 5-8

An elastomeric polycarbonate diol is prepared (Example 5) by transesterification of 1,6-hexanediol with diallyl carbonate in a molar ratio of 1.075. This product has an unsaturation content of less than 0.01 meq/g and a hydroxyl functionality exceeding 99% of theoretical. Another elastomeric polycarbonate diol (Example 6) is likewise prepared from a mixture of 1,6-hexanediol and 1,5-pentanediol (molar ratio 60/40), operating with a molar diol/diallyl carbonate ratio of 1.08. The product obtained has an unsaturation content of less than 0.01 meq/g. An elastomeric polycarbonate copolyester diol is also prepared (Example 7) by transesterification of 1,6-hexanediol, caprolactone and diallyl carbonate, with a molar 1,6-hexanediol/caprolactone ratio of 67/33 and a molar 1,6-hexanediol/diallyl carbonato ratio of 1.077. Finally, an elastomeric polycarbonate copolyester diol is prepared (Example 8) by transesterification using diallyl carbonate (1.91 moles), 1,6-hexanediol (1.5 moles) and a polyester diol oligomer (0.6 moles). The polyester diol oligomer is the product of condensation, conducted as reported in the description, between neopentyl glycol, 1,6-hexanediol and sebacic acid, in a molar ratio of 1:1:1, and has a number-average molecular weight (Mn) of 435 and an acid number of less than 1 mg KOH/g. Both the polycarbonate copolyester diols have an unsaturation content of less than 0.01 meq/g. The characteristics of the elastomeric polycarbonate diols and elastomeric polycarbonate copolyester diols are shown in Table 2.

TABLE 2

| Ex. No. | 5 | 6 | 7 | 8 |
| --- | --- | --- | --- | --- |
| OH No. (m KOH/g) | 56 | 46 | 45.4 | 40.2 |
| Melting point (°C.) | 46.8 | liq. | 12 | 9 |
| Tg (°C.) | −54 | −53.3 | −60.6 | −60.0 |
| Viscosity (Pa.s) 50° C. | 8.7 | 15.9 | 7.3 | 9 |
| 75° C. | 2.3 | 4.7 | 2.2 | 2.6 |
| Mn | 2000 | 2400 | 2400 | 2800 |

EXAMPLES 9-11

A vitreous polycarbonate diol is prepared (Example 9) by a transesterification reaction from cyclohexanedimethanol (isomer mixture) and diallyl carbonate in a molar ratio of 1.25. This product has an unsaturation content of less than 0.01 meq/g. A vitreous polycarbonate copolyester diol is likewise prepared (Example 10) from cyclohexanedimethanol (isomer mixture), 1,6-hexanediol and an oligopolyester diol (molar ratio 55:35:10), together with diallyl carbonate with a molar diol/diallyl carbonate ratio of 1.123. The oligopolyester diol is prepared by condensing terephthalic acid (0.63 moles) and dimethanol tricyclodecane (2.2 moles) and has an hydroxyl number of 146.9 mg KOH/g, a glass transition temperature (Tg) of 33.1° C., an acid number of 2 mg KOH/g and a number-average molecular weight (Mn) of 762. Finally, a vitreous polycarbonate copolyester diol is prepared (Example 11) from cyclohexanedimethanol (isomer mixture) and the oligopolyester diol described heretofore (in a molar ratio of 89:11) and diallyl carbonate with a diol/diallyl carbonate ratio of 1.13. The polycarbonate copolyester diols of Examples 10 and 11 have an unsaturation content of less than 0.01 meq/g and their characteristics are given in Table 3, together with those of the polycarbonate diol of Example 9.

TABLE 3

| Ex. No. | 9 | 10 | 11 |
| --- | --- | --- | --- |
| OH No. (mg KOH/g) | 143.5 | 57.6 | 63.3 |
| Melting point (°C.) | 53.6 | — | — |
| Tg (°C.) | −10 | 10.2 | 33.1 |
| Viscosity (Pa.s) 75° C. | 34.5 | — | — |
| 100° C. | 3.7 | 45.0 | — |
| Mn | 780 | 2000 | 1750 |

EXAMPLES 12-24

A total of 100 parts of polycarbonates together with 20 ml of xylene and 200 ppm of dibutyltin laurate are fed into a flask fitted with a bladed mechanical stirrer. The polycarbonates are melted (about 65° C.) and the diisocyanate is added in the molten state in a single portion under a dry nitrogen atmosphere while stirring. A temperature rise of 12°-18° C. occurs during the initial minutes of the reaction, after which the temperature of the reaction mass is raised to 95° C. over a period of 30 minutes and kept at this value for 60 minutes, after which the xylene is eliminated at 2 torr over about 30 minutes. Finally, the mass is cooled to −100° C., the flask is broken in a dry box and the reaction product transferred to a container in an inert atmosphere. Specifically:

in Example 12 (comparison), 100 parts by weight of the crystalline polycarbonate diol of Example 4 are reacted with diphenylmethane diisocyanate in a NCO-/OH ratio of 2.2;

in Example 13 (comparison), 100 parts by weight of the crystalline polycarbonate diol of Example 4 are reacted with diphenylmethane diisocyanate in a NCO-/OH ratio of 1.5;

in Example 14 (comparison), 100 parts by weight of the elastomeric polycarbonate diol of Example 5 are reacted with diphenylmethane diisocyanate in a NCO-/OH ratio of 2.2;

in Example 15, 50 parts by weight of the crystalline polycarbonate diol of Example 2 and 50 parts by weight of the elastomeric polycarbonate copolyester diol of Example 8 are reacted with diphenylmethane diisocyanate in a NCO/OH ratio of 2.2;

in Example 16, 30 parts by weight of the crystalline polycarbonate diol of Example 2 and 70 parts by weight of the elastomeric polycarbonate copolyester diol of Example 8 are reacted with diphenylmethane diisocyanate in a NCO/OH ratio of 2.2;

in Example 17, 50 parts by weight of the crystalline polycarbonate diol of Example 4 and 50 parts by weight of the elastomeric polycarbonate copolyester diol of Example 8 are reacted with diphenylmethane diisocyanate in a NCO/OH ratio of 2.2;

in Example 18, 50 parts by weight of the crystalline polycarbonate diol of Example 1 and 50 parts by weight of the elastomeric polycarbonate diol of Example 6 are reacted with diphenylmethane diisocyanate in a NCO-/OH ratio of 2.2;

in Example 19, 30 parts by weight of the crystalline polycarbonate diol of Example 2, 50 parts by weight of the elastomeric polycarbonate copolyester diol of Example 8 and 20 parts by weight of the vitreous polycarbonate copolyester diol of Example 11 are reacted with diphenylmethane diisocyanate in a NCO/OH ratio of 2.2;

in Example 20, 50 parts by weight of the crystalline polycarbonate diol of Example 3, 30 parts by weight of the elastomeric polycarbonate copolyester diol of Example 8 and 20 parts by weight of the vitreous polycarbonate copolyester diol of Example 11 are reacted with diphenylmethane diisocyanate in a NCO/OH ratio of 2.2;

in Example 21, 30 parts by weight of the crystalline polycarbonate diol of Example 2, 50 parts by weight of the elastomeric polycarbonate copolyester diol of Example 7 and 20 parts by weight of the vitreous polycarbonate diol of Example 9 are reacted with diphenylmethane diisocyanate in a NCO/OH ratio of 2.2;

in Example 22, 30 parts by weight of the crystalline polycarbonate diol of Example 2, 50 parts by weight of the elastomeric polycarbonate diol of Example 5 and 20 parts by weight of the vitreous polycarbonate copolyester diol of Example 10 are reacted with isophorone diisocyanate in a NCO/OH ratio of 1.85;

in Example 23 (comparison), 50 parts by weight of a polyester hexanediol polyadipate (number-average molecular weight 3600, OH number 31) and 50 parts by weight of a commercial polyester aliphatic glycol isophthalate (number-average molecular weight 3600, OH number 31, Tg −30° C.) are reacted with diphenylmethane diisocyanate in a NCO/OH ratio of 2.2; and in Example 24 (comparison), 50 parts by weight of a polyester hexanediol polyadipate (number-average molecular weight 3600, OH number 31) and 50 parts by weight of a commercial polyster aliphatic glycol isophthalate (number-average molecular weight 5600, OH number 20, Tg −50° C.) are reacted with diphenylmethane diisocyanate in a NCO/OH ratio of 2.2.

Some viscosity, melting point, ΔH of fusion and Tg values for the obtained reaction products are given in Table 4 below.

TABLE 4

| Ex. No. | Viscosity (Pa.s. 105° C.) | Melting point (°C.) | ΔH of fusion (J/g) | 26 Tg (°C.) |
|---|---|---|---|---|
| 12 | 30 | 61.4 | 76.3 | −20 |
| 13 | 100 | 67.9 | 72 | −17 |
| 15 | 48 | — | — | — |
| 16 | 40 | — | — | — |
| 17 | 27 | 63.4 | 40.0 | −38 |
| 18 | 42 | — | — | — |
| 19 | 47 | 54.1 | 22.6 | −22.3 |
| 20 | 46 | — | — | — |
| 21 | 50 | — | — | — |
| 22 | 25 | — | — | — |

To determine the characteristics of the reaction products of Examples 12–24, 10–15 g samples of these products are pressed between teflon plates to a thickness of 0.5 mm and the resultant 5×10 mm sheets are left to cross-link under environmental moisture (22° C., 50% relative humidity) and are then subjected to mechanical tests after completion of cross-linking. The results are given in Table 5, in which the "open time" means the time for which they are workable.

TABLE 5

| Ex. No. | Open time (seconds) | Tensile (kg/cm$^2$) | Modulus 100% (kg/cm$^2$) | Elongation (%) | Yield (kg/cm$^2$) |
|---|---|---|---|---|---|
| 12 | 10 | 218 | — | 500 | 198 |
| 13 | 5–10 | 366 | — | 800 | 127 |
| 14 | 90 | 150 | 80 | 500 | — |
| 15 | 50 | 195 | 60 | 700 | 64 |
| 16 | 75 | 130 | 37 | 1200 | — |
| 17 | 20 | 309 | — | 240 | 70 |
| 18 | 90 | 205 | — | 650 | 73 |
| 19 | 180 | 324 | 58 | 570 | — |
| 20 | 20 | 428 | — | 490 | 90 |
| 21 | 20 | 306 | 130 | 490 | — |
| 22 | 75 | 100 | 30 | 800 | — |
| 23 | 180 | 169 | 59 | 500 | — |
| 24 | 120 | 270 | 50 | 1360 | — |

For the hydrolytic stability test, certain samples are immersed in demineralized water for a time of 30 days at 50° C. After drying under vacuum and environmental reconditioning, the samples are subjected to mechanical tests, the results of which are given in Table 6.

TABLE 6

| Ex. No. | Tensile (kg/cm$^2$) | Modulus 100% (kg/cm$^2$) | Elongation (%) | Yield (kg/cm$^2$) |
|---|---|---|---|---|
| 14 | 85 | 50 | 320 | — |
| 15 | 198 | 34 | 860 | — |
| 16 | 83 | 26 | 900 | — |
| 19 | 208 | 50 | 640 | — |
| 20 | 380 | — | 550 | 98 |
| 22 | 80 | 21 | 700 | — |
| 23 | 26 | 21 | 230 | — |
| 24 | 15 | — | 18 | — |

The samples of Examples 14, 23 and 24 were immersed in water at 50° C. for only 15 days.

From the preceding data it can be seen that the samples obtained in accordance with the present invention have excellent mechanical characteristics which are comparable to those of traditional polyesters, but with a much higher hydrolytic resistance than these latter.

EXAMPLE 25

50 parts by weight of the crystalline polycarbonate diol of Example 4, 35 parts by weight of the elastomeric polycarbonate copolyester diol of Example 8 and 15 parts by weight of butadiene-acrylonitrile resin (commercially produced resinous tackiness agent, 20 mol% of acrylonitrile, OH No. 28), are reacted with diphenylmethane diisocyanate in a NCO/OH ratio of 2.2. The product obtained has the following characteristics: viscosity 90 Pa.s at 105° C., melting point 61.8° C., ΔH of fusion 38.8 J/g, Tg −38.5° C. This product is formed into a cross-linked sheet having the following characteristics: open time 15 seconds, tensile 260 kg/cm$^2$, elongation 780%, yield 70 kg/cm$^2$. After ageing in water at 50° C. for 30 days, the following characteristics are found: tensile 250 kg/cm$^2$, elongation 550%, yield 98 kg/cm$^2$.

We claim:

1. A hot melt composition cross-linkable by the action of environmental humidity or heat to form cross-linked products having high degradation resistance, comprising the product of the reaction between:
   (A) an aliphatic or aromatic diisocyanate, and
   (B) a mixture of the following diols:
       (1) a crystalline polycarbonate diol having a number-average molecular weight (Mn) of between 1,000 and 10,000, a glass transition temperature (Tg) of less than −50° C., and a ΔH of crystallization equal to or greater than 80 J/g, prepared by a transesterification reaction between an organic carbonate and one or more HO—(CH$_2$)$_x$—OH aliphatic diols, where x is a whole number equal to or greater than 8,
       (2) an elastomeric polycarbonate diol or an elastomeric polycarbonate copolyester diol, having a number-average molecular weight (Mn) of between 1,500 and 6,000 and a glass transition temperature of between −35° and −60° C., said elastomeric polycarbonate diol being prepared by a transesterification reaction between an organic carbonate and one or more HO—(CH$_2$)$_y$—OH aliphatic diols, where y is a whole number less than 8, or said elastomeric polycarbonate copolyester diol being prepared by a transesterification reaction between an organic carbonate, one or more HO—(CH$_2$)$_y$—OH aliphatic diols, where y has the aforesaid meaning, and a lactone or an aliphatic polyester diol oligomer, and (3) a vitreous polycarbonate diol or a vitreous polycarbonate copolyester diol having a number-average molecular weight (Mn) of between 600 and 6,000 and a glass transition temperature (Tg) of between $-10°$ and $50°$ C., said vitreous polycarbonate diol being prepared by a transesterification reaction between an organic carbonate and a cycloaliphatic diol or mixture of cycloaliphatic and aliphatic diols, said vitreous polycarbonate copolyester diol being prepared by reaction between an organic carbonate, a cycloaliphatic diol or mixture of cycloaliphatic and aliphatic diols, and an aromatic polyester diol oligomer, wherein for each part by weight of the sum of (1), (2) and (3), component (1) is present in a quantity of between 30 and 70 parts by weight, component (2) is present in a quantity of at least 20 parts by weight, and component (3) is present in a quantity of between 0 and 50 parts by weight, and the ratio of NCO groups of component (A) to OH groups of component (B) exceeds 1.

2. A composition as claimed in claim 1, characterised in that the diol mixture (B) contains between 30 and 50 parts by weight of component (1), between 30 and 70 parts by weight of component (2) and between 0 and 40 parts by weight of component (3) per 100 parts by weight of the sum of components (1), (2) and (3), and the ratio of NCO groups of component (A) to OH groups of component (B) varies between 1.5 and 2.2.

3. A composition as claimed in claim 1, characterised in that component (A) is chosen from diphenylmethane diisocyanate, hydrogenated diphenylmethane diisocyanate, isophorone diisocyanate, hexamethylene diisocyanate, tetramethyl xylylene diisocyanate, phenylene diisocyanate and tolylene diisocyanate.

4. A composition as claimed in claim 1, characterised in that the crystalline polycarbonate diol (B1) has a number-average molecular weight (Mn) of between 2,000 and 4,000, and a $\Delta H$ of crystallization of between 80 and 115 J/g.

5. A composition as claimed in claims 1 and 4, characterised in that said crystalline polycarbonate diol (B1) is prepared by transesterification of diallyl carbonate and 1,10-decanediol, 1,12-dodecanediol or mixtures of the two.

6. A composition as claimed in claim 1, characterised in that the elastomeric polycarbonate diol or elastomeric polycarbonate copolyester diol (B2) has a number-average molecular weight (Mn) of between 2,000 and 4,000 and a glass transition temperature of between $-50°$ and $-60°$ C.

7. A composition as claimed in claims 1 and 6, characterised in that said elastomeric polycarbonate diol is prepared by transesterification of diallyl carbonate and 1,5-pentanediol, 1,6-nexanediol or mixtures of the two.

8. A composition as claimed in claims 1 and 6, characterised in that said elastomeric polycarbonate copolyester diol (B2) is prepared by transesterification of diallyl carbonate, caprolactone and 1,5-pentanediol or 1,6-hexanediol or mixtures of the two.

9. A composition as claimed in claims 1 and 6, characterised in that said elastomeric polycarbonate copolyester diol (B2) is prepared by transesterification of diallyl carbonate, 1,5-pentanediol or 1,6-hexanediol or mixtures of the two, and an aliphatic polyester diol oligomer of number-average molecular weight (Mn) between 350 and 750 prepared by condensing an aliphatic dicarboxylic acid chosen from succinic, adipic, sebacic and dodecanoic acid, neopentyl glycol, and 1,5-pentanediol or 1,6-hexanediol or mixtures of the two.

10. A composition as claimed in claim 1, characterised in that the vitreous polycarbonate diol or vitreous polycarbonate copolyester diol (B3) has a number-average molecular weight (Mn) of between 700 and 3,000.

11. A composition as claimed in claims 1 and 10, characterised in that said vitreous polycarbonate diol (B3) is prepared by transesterification of diallyl carbonate and cyclohexanedimethanol or tricyclohexanedimethanol, and possibly an aliphatic diol.

12. A composition as claimed in claims 1 and 10, characterised in that said vitreous polycarbonate copolyester diol (B3) is prepared by transesterification of diallyl carbonate and cyclohexanedimethanol or tricyclohexanedimethanol, and possibly an aliphatic diol, and an aromatic polyester diol oligomer of number-average molecular weight (Mn) between 500 and 1000 prepared by condensing phthalic, isophthalic or terephthalic acid with cyclohexanedimethanol or tricyclohexanedimethanol.

13. A composition as claimed in claim 1, characterised in that the reaction between components (A) and (B) is conducted in bulk at a temperature of between $60°$ and $100°$ C. for a time of between 0.5 and 6 hours, either in the absence of catalysts or in the presence of a catalyst chosen from organometallic tin, lead, mercury and titanium compounds.

14. A composition as claimed in claim 1, characterised by additionally containing one or more of the following: crosslinking catalysts, adhesion promoters, inorganic fillers, antioxidants, stabilizers, flame retardants and resinous tackiness agents.

* * * * *